(12) United States Patent
Lee et al.

(10) Patent No.: US 7,507,096 B1
(45) Date of Patent: Mar. 24, 2009

(54) DATA STORAGE DEVICE SECURITY SYSTEM

(75) Inventors: Mike Lee, San Jose, CA (US); Maurice Schlumberger, Menlo Park, CA (US); Yin Shih, Saratoga, CA (US); Matt Levy, San Francisco, CA (US)

(73) Assignee: Maxtor Corporation, Scotts Valley, CA (US)

( * ) Notice: Subject to any disclaimer, the term of this patent is extended or adjusted under 35 U.S.C. 154(b) by 84 days.

(21) Appl. No.: 11/246,918

(22) Filed: Oct. 7, 2005

Related U.S. Application Data (60) Provisional application No. 60/617,113, filed on Oct. 8, 2004.

(51) Int. Cl.
*H01R 13/44* (2006.01)
(52) U.S. Cl. ...................................... 439/133
(58) Field of Classification Search ................. 439/133, 439/134, 304, 911; 70/57, 58; 29/825, 824
See application file for complete search history.

(56) References Cited

U.S. PATENT DOCUMENTS

| | | | | |
|---|---|---|---|---|
| 5,288,241 | A * | 2/1994 | Davidge et al. | 439/304 |
| 5,327,752 | A | 7/1994 | Myers et al. | 70/58 |
| 6,059,599 | A * | 5/2000 | Huang | 439/362 |
| 6,234,827 | B1 | 5/2001 | Nishio et al. | 439/357 |
| 6,796,152 | B1 * | 9/2004 | Yu | 70/58 |
| 6,811,415 | B2 * | 11/2004 | Chen | 439/133 |
| 6,848,926 | B2 * | 2/2005 | Ling et al. | 439/304 |
| 6,902,432 | B2 * | 6/2005 | Morikawa et al. | 439/607 |
| 7,083,438 | B2 * | 8/2006 | Massaro et al. | 439/133 |
| 7,140,903 | B2 * | 11/2006 | Pulizzi et al. | 439/371 |
| 2002/0004874 | A1 * | 1/2002 | Agata et al. | 711/1 |
| 2005/0015977 | A1 * | 1/2005 | Decime et al. | 29/854 |

* cited by examiner

*Primary Examiner*—Alexander Gilman
(74) *Attorney, Agent, or Firm*—Shumaker & Sieffert, P.A.

(57) ABSTRACT

A locking data cable (24) is disclosed. The data cable (24) includes a data plug (26) and an associated lock (32). When the data plug (26) is engaged with a data port (16) of a data storage device (12), an actuator (38) of the locking data cable (24) may be used to change the lock (32) from an unlocked position to a locked position.

23 Claims, 4 Drawing Sheets

DATA STORAGE DEVICE SECURITY SYSTEM

CROSS-REFERENCE TO RELATED APPLICATIONS

This patent application claims priority under 35 U.S.C. §119(e) to U.S. Provisional Patent Application Ser. No. 60/617,113, that is entitled "LOCKING DATA CABLE," that was filed on Oct. 8, 2004, and the entire disclosure of which is hereby incorporated by reference in its entirety herein.

FIELD OF THE INVENTION

The present invention generally relates to the field of data storage devices and, more particularly, to a security system for such a data storage device that uses an actuatable lock that is associated with a data plug and that preferably retains the data plug in engagement with a data port of the data storage device.

BACKGROUND OF THE INVENTION

Information may be stored on a wide variety of devices. Many data storage devices are quite portable, and thereby subject to theft. Various types of security devices have been proposed in this regard. For instance, many laptops now have a security or locking slot for receiving a lock that is attached to a cable. The lock may be inserted into this slot on the laptop, and the cable may be anchored to an appropriate structure to physically secure the laptop to the anchoring structure.

Physical security of data storage devices is of course an important concern. However, security of the data on such a data storage device is another important concern. Consider the case of an external hard drive that may be interconnected with a computer through a USB cable. If the external hard drive is left unattended, someone could simply connect his or her computer to this external hard drive and obtain data from the external hard drive.

BRIEF SUMMARY OF THE INVENTION

A first aspect of the present invention is generally directed to a data storage system having a first data storage device. This first data storage device includes a first data storage medium, as well as a first data port that is operatively interconnected with this first data storage medium. The data storage system further includes a first data plug that is engaged with the first data port. A first lock is associated with the first data plug to retain the first data plug in engagement with the first data port when the first lock is in a locked position. A first actuator is at least operatively interconnectable with the first lock so as to be able to move the first lock between locked and unlocked positions, including at a time when the first data plug is engaged with the first data port.

Various refinements exist of the features noted in relation to the first aspect of the present invention. Further features may also be incorporated in the first aspect of the present invention as well. These refinements and additional features may exist individually or in any combination. The first data storage device may be of any appropriate type (e.g., an external hard drive, a laptop computer, a desktop computer) and may be of any appropriate size, shape, and/or configuration. Each of the first data storage medium and the first data port used by the first data storage device also may be of any appropriate type, as may be the first data plug. In one embodiment, the first data port is in the form of a USB port.

The first data storage device used by the first aspect may include a locking slot for receiving one or more latching members of the first lock. This locking slot may be of any appropriate size, shape, and/or configuration, and may be disposed at any appropriate location on the first data storage device. In one embodiment, the locking slot is adjacent to the first data port.

The first lock used by the first aspect may be of any appropriate configuration. Generally, the first lock may include one or more members that are expandable/contractable through operation of the first actuator. In one embodiment, the first lock includes what may be characterized as a movable first latching member whose position is controlled by the first actuator. Any appropriate type of movement may be used by the first latching member, including pivotal motion. In one embodiment, having the first actuator in a first position corresponds with the first latching member being in a locked position, while having the first actuator in a second position corresponds with the first latching member being in an unlocked position. The first actuator may be of any appropriate size, shape, and/or configuration. For instance, the first actuator may simply be in the form of a button, where depressing this button moves the first latching member from one position to another position. It may be desirable to include one or more tumblers that each need to be disposed in a certain position (e.g., a "combination") in order to allow the button to be depressed. Another option is for the first actuator to be in the form of a key, where having the key in a first position corresponds with the first latching member being in a locked position and where having the key in a second position corresponds with the first latching member being in an unlocked position. Regardless of the size, shape, and/or configuration of the first actuator, the first actuator is an independently operable structure. The first actuator may move the first latching member between at least two different positions while the first data plug is fully engaged with the first data port. Movement of the first data plug relative to the first data port also is preferably not required to actuate the first actuator. That is, movement of the first latching member from a locked position to an unlocked position is preferably not merely responsive to an attempt to withdraw the first data plug from the first data port, but instead is responsive to a movement by the first actuator.

Any appropriate way of integrating the first lock with the first data plug may be utilized in relation to the first aspect. In one embodiment, the first lock is mounted on a part of the first data plug that is not disposed within the first data port such that a movable latching member of the first lock is disposed exteriorly of the first data plug. In another embodiment, a movable latching member of the first lock is disposed within the interior of the first data plug.

The first data plug and the associated first lock used by the first aspect may assume a variety of forms. One embodiment has the first data plug and the first lock being associated with a data cable. One or both ends of the data cable may include a data plug, an associated lock, and an associated actuator. Such a data cable may provide both data security (reducing the potential for an intruder being able to access the first data port and retrieve data from the first data storage medium of the first data storage device) and physical security (reducing the potential that the first data storage device may be stolen). Another embodiment has the first data plug and the first lock being associated with what may be characterized as a removable second data storage device (e.g., a "memory stick").

Locking the second data storage device to the first data port of the first data storage device may provide both data security (reducing the potential for an intruder being able to access the first data port and retrieve data from the first data storage medium of the first data storage device) and physical security (reducing the potential that the second data storage device may be stolen separately from the first data storage device). Yet another option would be for the first data plug to simply mechanically obstruct access to the first data port on the first data storage device (reducing the potential for an intruder being able to access the first data port and retrieve data from the first data storage medium of the first data storage device). That is, the first data plug could simply be a "dummy plug."

A second aspect of the present invention is generally directed to a data storage system having a first data storage device. This first data storage device includes a first data storage medium, as well as a first data port that is operatively interconnected with this first data storage medium. The data storage system further includes a first data cable having a first data plug that is engaged with the first data port of the first data storage device. The first data cable further includes a first lock that retains the first data plug in engagement with the first data port when the first lock is in a locked position. A first actuator is at least operatively interconnectable with the first lock so as to be able to move the first lock between locked and unlocked positions, including at a time when the first data plug is engaged with the first data port.

Various refinements exist of the features noted in relation to the second aspect of the present invention. Further features may also be incorporated in the second aspect of the present invention as well. These refinements and additional features may exist individually or in any combination. The first data storage device may be of any appropriate type (e.g., an external hard drive, a laptop computer, a desktop computer) and may be of any appropriate size, shape, and/or configuration. Each of the first data storage medium and the first data port used by the first data storage device also may be of any appropriate type, as may be the first data plug. In one embodiment, the first data port is in the form of a USB port.

The first data storage device used by the second aspect may include a locking slot for receiving one or more latching members of the first lock. This locking slot may be of any appropriate size, shape, and/or configuration, and may be disposed at any appropriate location on the first data storage device. In one embodiment, the locking slot is adjacent to the first data port.

The first lock used by the second aspect may be of any appropriate configuration. Generally, the first lock may include one or more members that are expandable/contractable through operation of the first actuator. In one embodiment, the first lock includes what may be characterized as a movable first latching member whose position is controlled by the first actuator. Any appropriate type of movement may be used by the first latching member, including pivotal motion. In one embodiment, having the first actuator in a first position corresponds with the first latching member being in a locked position, while having the first actuator in a second position corresponds with the first latching member being in an unlocked position. The first actuator may be of any appropriate size, shape, and/or configuration. For instance, the first actuator may simply be in the form of a button, where depressing this button moves the first latching member from one position to another position. It may be desirable to include one or more tumblers that each need to be disposed in a certain position (e.g., a "combination") in order to allow the button to be depressed. Another option is for the first actuator to be in the form of a key, where having the key in a first position corresponds with the first latching member being in a locked position and where having the key in a second position corresponds with the first latching member being in an unlocked position. Regardless of the size, shape, and/or configuration of the first actuator, the first actuator is an independently operable structure. The first actuator may move the first latching member between at least two different positions while the first data plug is fully engaged with the first data port. Movement of the first data plug relative to the first data port also is preferably not required to actuate the first actuator. That is, movement of the first latching member from a locked position to an unlocked position is preferably not merely responsive to an attempt to withdraw the first data plug from the first data port, but instead is responsive to a movement by the first actuator.

Any appropriate way of integrating the first lock with the first data plug may be utilized in relation to the second aspect. In one embodiment, the first lock is mounted on a part of the first data plug that is not disposed within the first data port such that a movable latching member of the first lock is disposed exteriorly of the first data plug. In another embodiment, a movable latching member of the first lock is disposed within the interior of the first data plug.

One or both ends of the first data cable may include a data plug, an associated lock, and an associated actuator in the case of the second aspect. Such a data cable may provide both data security (reducing the potential for an intruder being able to access the first data port and retrieve data from the first data storage medium of the first data storage device) and physical security (reducing the potential that the first data storage device may be stolen).

A third aspect is embodied by what may be characterized as a locking data cable. This data cable includes a first data plug and a communication cable/path that is at least operatively interconnected with this first data plug. A first lock is associated with this first data plug, and a first actuator is at least operatively interconnectable with this first lock for moving the first lock between a locked position and an unlocked position.

Various refinements exist of the features noted in relation to the third aspect of the present invention. Further features may also be incorporated in the third aspect of the present invention as well. These refinements and additional features may exist individually or in any combination. The first data plug may be of any appropriate size, shape, configuration, and/or type. In one embodiment, the first data plug is of the type that is used with a USB port. The first data plug, first lock, and first actuator could be provided on only one end of the data cable, or one first data plug, one first lock, and one first actuator could be provided for one end of the data cable, and another first data plug, another first lock, and another first actuator could be provided for the opposite end of the data cable.

The first lock used by the third aspect may be of any appropriate configuration. Generally, the first lock may include one or more members that are expandable/contractable through operation of the first actuator. In one embodiment, the first lock includes what may be characterized as a movable first latching member whose position is controlled by the first actuator. Any appropriate type of movement may be used by the first latching member, including pivotal motion. In one embodiment, having the first actuator in a first position corresponds with the first latching member being in a locked position, while having the first actuator in a second position corresponds with the first latching member being in an unlocked position. The first actuator may be of any appropriate size, shape, and/or configuration. For instance, the first actuator may simply be in the form of a button, where depressing this button moves the first latching member from one position to another position. It may be desirable to include one or more tumblers that each need to be disposed in a certain position (e.g., a "combination") in order to allow the button to be depressed. Another option is for the first actuator to be in the form of a key, where having the key in a first position corresponds with the first latching member being in a locked position and where having the key in a second position corresponds with the first latching member being in an unlocked position. Regardless of the size, shape, and/or configuration of the first actuator, the first actuator is an independently operable structure. The first actuator may move the first latching member between at least two different positions while the first data plug is fully engaged with an associated data port of a data storage device. Movement of the first data plug relative to the associated data port also is preferably not required to actuate the first actuator. That is, movement of the first latching member from a locked position to an unlocked position is preferably not merely responsive to an attempt to withdraw the first data plug from the associated data port, but instead is responsive to a movement by the first actuator.

Any appropriate way of integrating the first lock with the first data plug may be utilized in relation to the third aspect. In one embodiment, the first lock is mounted on a part of the first data plug that is not disposed within an associated data port of a data storage device such that a movable latching member of the lock is disposed exteriorly of the first data plug. In another embodiment, a movable latching member of the first lock is disposed within the interior of the first data plug.

A fourth aspect is embodied by what may be characterized as a removable data storage device. This removable data storage device includes an appropriate data storage medium, a first data plug that is operatively interconnected with this data storage medium, a first lock that is associated with this first data plug, and a first actuator that is at least operatively interconnectable with this first lock for moving the first lock between a locked position and an unlocked position.

Various refinements exist of the features noted in relation to the fourth aspect of the present invention. Further features may also be incorporated in the fourth aspect of the present invention as well. These refinements and additional features may exist individually or in any combination. The removable data storage device may be of any appropriate size, shape, configuration, and/or type (e.g., a "memory stick"). The first data plug may be of any appropriate size, shape, configuration, and/or type. In one embodiment, the first data plug is of the type that is used with a USB port.

The first lock used by the fourth aspect may be of any appropriate configuration. Generally, the first lock may include one or more members that are expandable/contractable through operation of the first actuator. In one embodiment, the first lock includes what may be characterized as a movable first latching member whose position is controlled by the first actuator. Any appropriate type of movement may be used by the first latching member, including pivotal motion. In one embodiment, having the first actuator in a first position corresponds with the first latching member being in a locked position, while having the first actuator in a second position corresponds with the first latching member being in an unlocked position. The first actuator may be of any appropriate size, shape, and/or configuration. For instance, the first actuator may simply be in the form of a button, where depressing this button moves the first latching member from one position to another position. It may be desirable to include one or more tumblers that each need to be disposed in a certain position (e.g., a "combination") in order to allow the button to be depressed. Another option is for the first actuator to be in the form of a key, where having the key in a first position corresponds with the first latching member being in a locked position and where having the key in a second position corresponds with the first latching member being in an unlocked position. Regardless of the size, shape, and/or configuration of the first actuator, the first actuator is an independently operable structure. The first actuator may move the first latching member between at least two different positions while the first data plug is fully engaged with an associated data port of a data storage device. Movement of the first data plug relative to the associated data port also is preferably not required to actuate the first actuator. That is, movement of the first latching member from a locked position to an unlocked position is preferably not merely responsive to an attempt to withdraw the first data plug from the associated data port, but instead is responsive to a movement by the first actuator.

Any appropriate way of integrating the first lock with the first data plug may be utilized in relation to the fourth aspect. In one embodiment, the first lock is mounted on a part of the first data plug that is not disposed within an associated data port of a data storage device such that a movable latching member of the lock is disposed exteriorly of the first data plug. In another embodiment, a movable latching member of the first lock is disposed within the interior of the first data plug.

DETAILED DESCRIPTION OF THE INVENTION

Figure 1A:
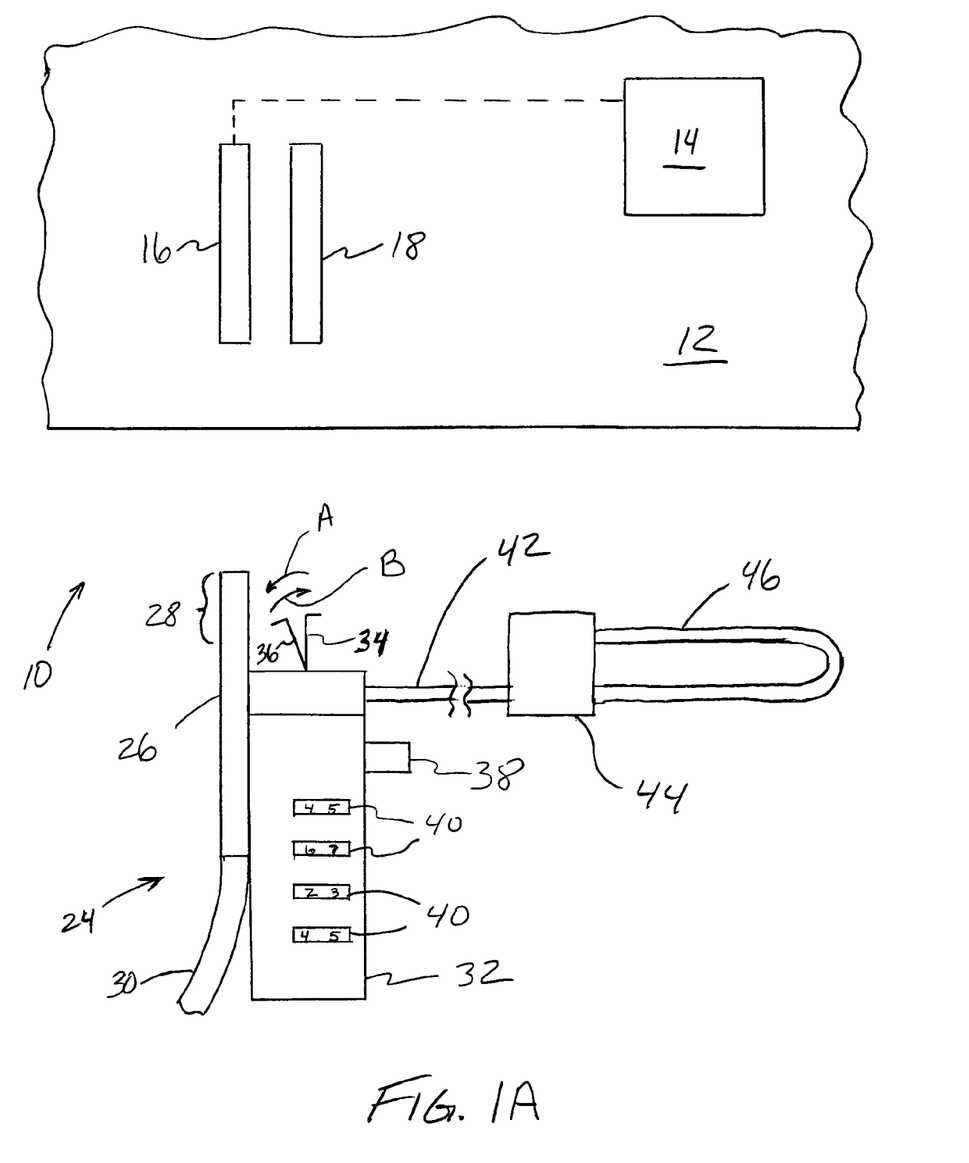
FIG. 1A is a schematic of one embodiment of a data storage system that uses a locking data cable.
Figure 1B:
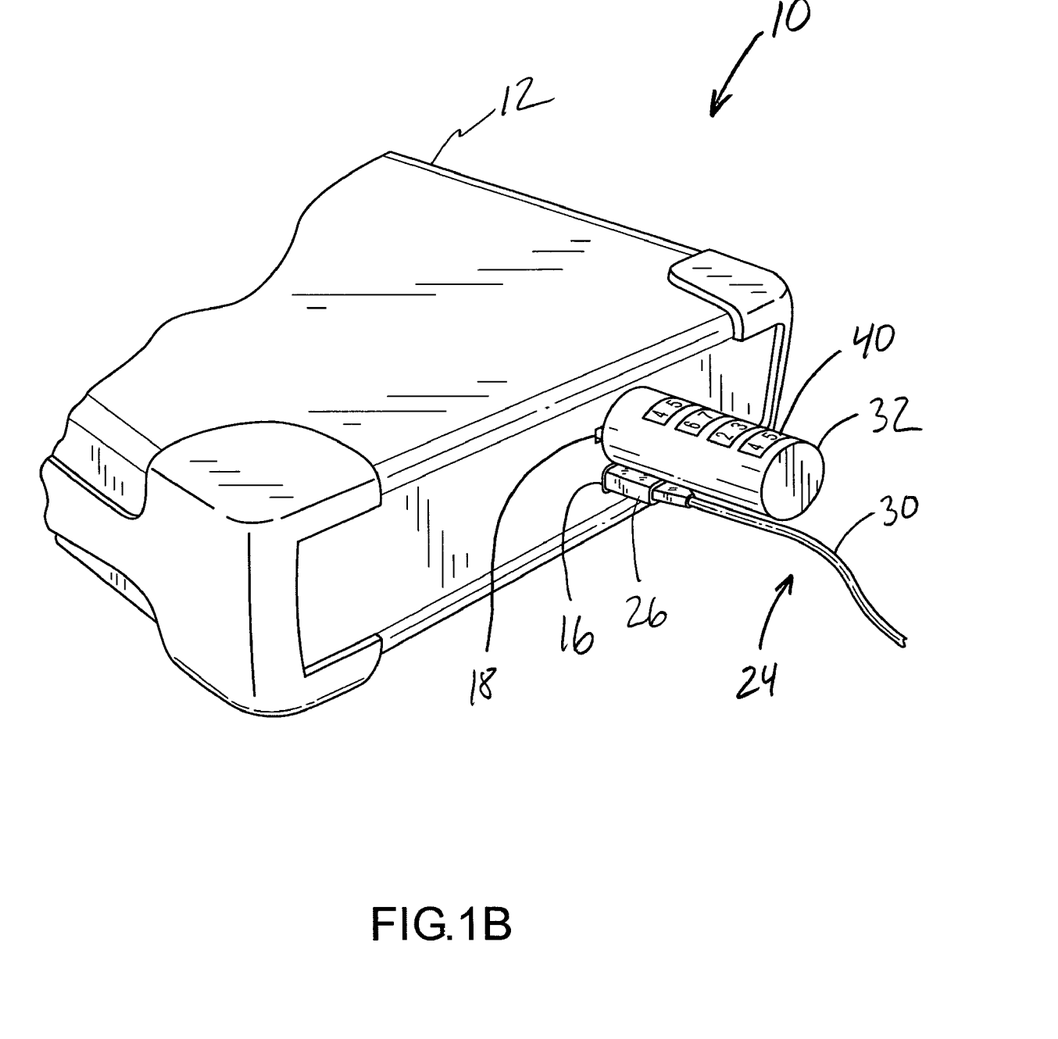
FIG. 1B is a perspective of the locking data cable of FIG. 1A in the installed position, with the data storage device from FIG. 1A being in the form of an external hard drive.
Figure 2:
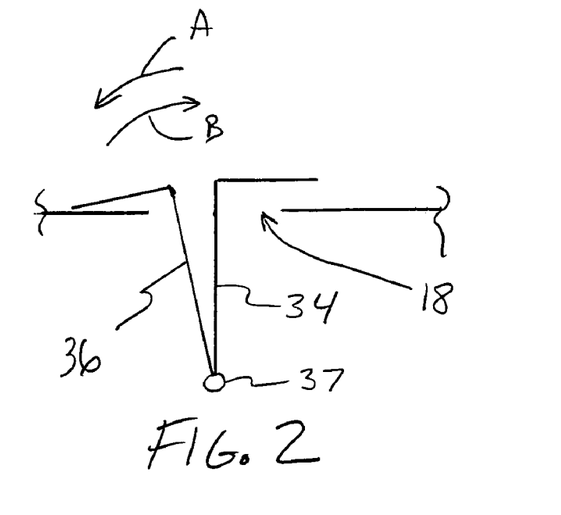
FIG. 2 is a schematic of an actuatable lock of the locking data cable that is disposed within a locking slot of a data storage device in accordance with the data storage system of FIG. 1A.

The present invention will now be described in relation to the accompanying drawings, which at least assist in illustrating its various pertinent features. FIGS. 1A, 1B, and 2 illustrate one embodiment of a data storage system 10 having a data storage device 12 and a locking data cable 24. FIG. 1A shows the data storage device 12 and the locking data cable 24 in a disconnected state and with the data storage device 12 being of a generic form, while FIG. 1B shows the locking data cable 24 connected to a data port 16 of the data storage device 12 and with the data storage device 12 being in the form of an external hard drive. In the FIG. 1B connected condition, the data cable 24 physically blocks access to the data port 16 and is locked thereto, thereby reducing the potential that information on the data storage device 12 can be retrieved other than via the data cable 24. In this regard, the opposite end of the data cable 24 may also be locked to its corresponding device, or the opposite end of the data cable 24 may otherwise be secured (e.g., by having the device, to which the data storage device 12 is connected by the cable 24, be in a physically secured location). In any case, an intruder with a laptop or the like should not be able to connect to the data storage device 12 through its data port 16 using a different data cable, thereby reducing the potential of information being hijacked from the data storage device 12. The locking data cable 24 also provides at least a degree of physical security for the data storage device 12 itself—in effect physically anchoring the data storage device 12 to the device to which it is connected by the data cable 24.

The data storage device 12 may be of any appropriate type (e.g., an external hard drive per FIG. 1B). Generally, the data storage device 12 includes a data storage medium 14 of any appropriate type, a data port 16 of any appropriate type that is interconnected with the data storage medium 14, and a locking slot 18 of any appropriate size, shape, and/or configuration. In the illustrated embodiment, the data port 16 is a USB port and the locking slot 18 is disposed adjacent to this data port 16. Both the data port 16 and the locking slot 18 may be disposed at any appropriate location on the data storage device 12.

The data cable 24 includes a data plug 26, that in turn includes a section 28 that is disposed within the data port 16 of the data storage device 12, and that provides signals to/from the communication cable 30 of the data cable 24. The data cable 24 further includes a lock 32 that is associated with the data plug 26. Another lock 32 could be associated with the opposite end of the data cable 24. In any case, the lock 32 includes what may be characterized as a stationary latch member 34 and a movable latch member 36 that are disposable within the locking slot 18 of the data storage device 12. In this regard, the lock 32 further includes an actuator 38 for moving the latch member 36 along any appropriate path and in any appropriate manner. That is, the actuator 38 is at least operatively interconnected with the latch member 36 to actuate the same. In the illustrated embodiment, the actuator 38 is in the form of a button or the like, and the latch member 36 pivots about a pivot axis 37. Notably, the actuator 38 is located externally of the data storage device 12 when the data cable 24 is interconnected with the data storage device 12.

A plurality of tumblers 40 are provided for the lock 32. Any number of tumblers 40 could be utilized. When the various tumblers 40 are each disposed in a certain position (i.e., the "combination" of the lock 32), the actuator 38 may be depressed to move the latch member 36 in the direction indicated by the arrow B so that the latch members 34, 36 may be directed into the locking slot 18 of the data storage device 12 as the data plug 26 is directed into the data port 16 of the data storage device 12. Once the data plug 26 and the latch members 34, 36 are fully engaged with the data port 16 and the locking slot 18, respectively, the actuator 38 may be released. Releasing the actuator 38 causes the latching member 36 to move in the direction of the arrow A. This locks the data cable 24 in engagement with the data storage device 12 (i.e., the end sections of the latch members 34, 36 are now collectively wider than the locking slot 18). It should be appreciated that one or more of the tumblers 40 should be repositioned at this time such that actuator 38 cannot be depressed (to move the latch member 36 in the direction of the arrow B) without re-entering the combination. When it is once again desirable to disconnect the data cable 24 from the data storage device 12, the various tumblers 40 need to be disposed into a position that allows the actuator 38 to be depressed, to in turn move the latch member 36 to the unlocked position. That is, the movement of the latch member 36 (from the locked position to an unlocked position) is provided by actuation of the actuator 38, and not by the mere withdrawal of the data plug 26 of the data cable 24 from the data port 16 of the data storage device 12.

In the illustrated embodiment, the actuator 38 is biased into a position that disposes the latch member 36 in the locked position of FIGS. 1-2, and depressing the actuator 38 against this biasing force disposes the latch member 36 in the unlocked position where the latch members 34, 36 may be directed into or removed from the locking slot 18 of the data storage device 12. It should be appreciated that the reverse configuration could be utilized as well. Moreover, any appropriate lock configuration that includes at least some type of movable actuator for moving at least one latching or locking member between a locked position and an unlocked position could be utilized by the data cable 24. Representative configurations of locks of the type that may be used by the data cable 24 include the lock used by the DEFCON™ CL Notebook Combination Cable Lock available from Targus, Inc., as well as the locks disclosed by U.S. Pat. Nos. 5,502,989; 5,381,685, and 5,372,752, the entire disclosures of which are incorporated by reference in their entirety herein.

Having the lock 32 of the data cable 24 in the locked position while the data plug 26 of the data cable 24 is engaged with the data port 16 of the data storage device 12 provides a level of security for the data stored on the data storage medium 14 of the data storage device 12 (e.g., FIG. 1B). That is, an intruder cannot simply disconnect the data cable 24 and insert another data cable into the data port 16 to retrieve information from the data storage device 12. Stated another way, the data port 16 of the data storage device 12 is in effect locked and not accessible. The data cable 24 also provides a level of physical security for the data storage device 12. As noted, a lock could be associated with the opposite end of the data cable 24, which should reduce the potential that the data storage device 12 may be stolen separate from the device to which it is connected by the locking data cable 24. Physical security of the data storage device 12 may also be addressed by including an optional security cable 42 (see FIG. 1A; not shown in FIG. 1B). In the illustrated embodiment, the security cable 42 is anchored at one end to the body of the lock 32. The security cable 42 includes a loop 46 on its opposite end that may be defined using a collar 44. The loop 46 could be positioned on an appropriate anchoring structure, or the data plug 26 and the lock 32 could be directed through the loop 46 of the security cable 42 to anchor the security cable 42 to an appropriate anchoring structure. It should be appreciated that the security cable 42 could also be of the type that is directed through an aperture associated with the lock 32 (not shown).

Figure 3:
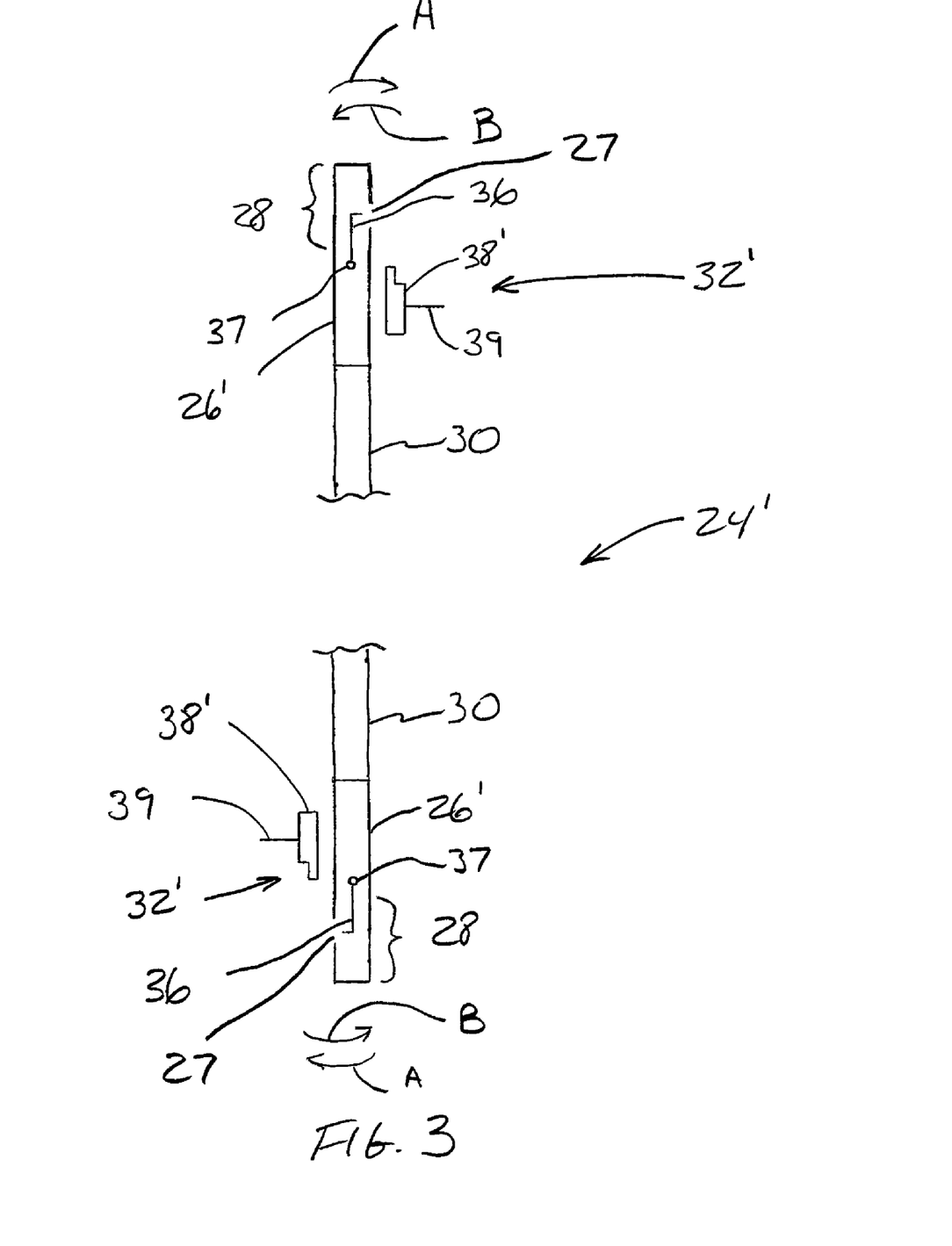
FIG. 3 is an alternative embodiment of a locking data cable having an actuatable lock, and that may be used by the data storage device of the data storage system of FIG. 1A.

An alternative embodiment of the data cable 24 is illustrated in FIG. 3, is identified by reference numeral 24', and includes a lock 32' and actuator 38' at each of its two ends. Corresponding components between the embodiment of FIGS. 1-2 and the embodiment of FIG. 3 are identified by the same reference numeral. A "single prime" designation is used to identify the existence of a structural difference between the corresponding components. The goal of the data cable 24' is to not require any retrofitting of a data storage device in order for the data cable 24' to be locked thereto. That is, preferably any lock that is used by the data cable 24' does not require any alteration of the data storage device to which the data cable is to be attached.

One difference between the data cable 24' of FIG. 3 and the data cable 24 of FIGS. 1-2 is that the lock 32' is structurally integrated with the data plug 26' in a different manner. The lock 32' also does not use a stationary latch member 34, although one could be provided. Although the lock 32' does use a movable latch member 36, the movable latch member 36 is disposed within the data plug 26' at least at some point it time. Another difference is that the actuator 38' is in the form of a key (having an associated handle 39) in the case of the embodiment of FIG. 3. However, the actuator 38 could be used by the lock 32' as well. Generally, any appropriate lock configuration that includes one or more internally located latching members (internal to the data plug 26' in accordance with the foregoing), along with at least some type of movable actuator for moving at least one latching or locking member between a locked position and an unlocked position, could be utilized by the data cable 24'.

Inserting the key 38' and disposing the same in one position will move the latch member 36 to the unlocked position illustrated in FIG. 3, while moving the key 38' to a different position will move the latch member 36 to a locked position. In the locked position, the end section of the latch member 36 will pass through an aperture 27 of the data plug 26' so as to inhibit the withdrawal of the data plug 26' from the data port 16 of the data storage device 12. For instance, the end section of the latch member 36 in the locked position may be such that it is disposed within a recess formed on a wall defining the associated data port 16, or it may be positioned "behind" an appropriate structure within the associated data port 16.

Figure 4:
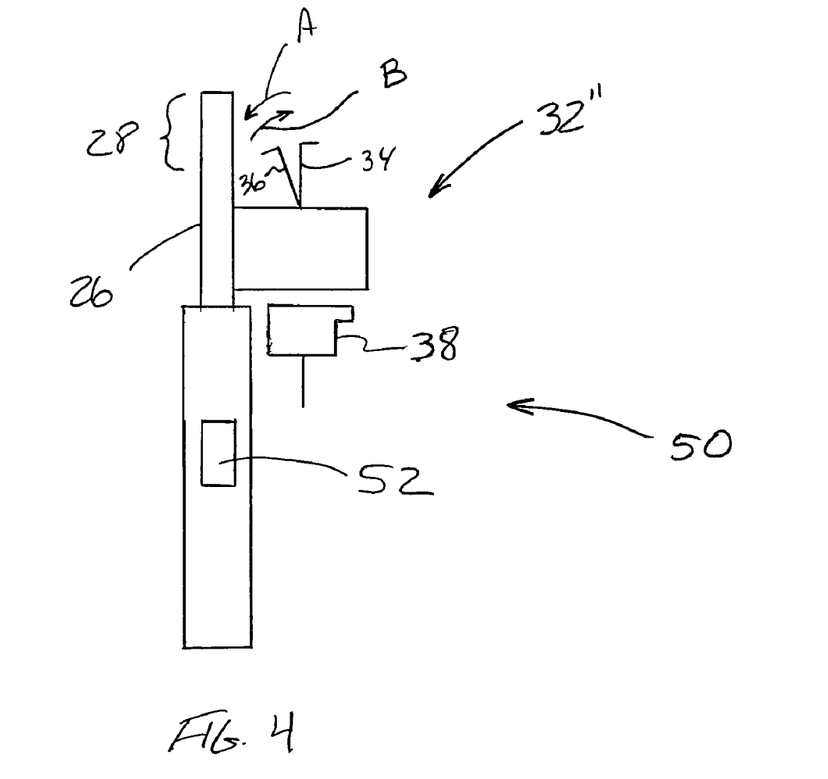
FIG. 4 is a schematic of one embodiment of a removable data storage device having an actuatable lock.

FIG. 4 illustrates an embodiment of a removable data storage device 50 (e.g., what is commonly referred to as a "memory stick") that has a data storage medium 52 of any appropriate type. The data storage device 50 includes a data plug 26 and an associated lock 32". Any of the locks described herein could be used by the data storage device 50 as well. In any case, the lock 32" is mounted on the data plug 26, includes a stationary latch member 34 and a movable latch member 36, and an actuator 38' in the form of a key for moving the latch member 36 between a locked position and an unlocked position. This actuator 38' again is externally located when the section 28 of the data plug 26 is disposed within a data port, and is actuatable independent of any movement between the data plug 26 and its associated data port. That is, the actuator 38' may be moved without moving the data plug 26 relative to the associated data port, to in turn cause the movement of the latching member 36. Including the lock 32" with the removable data storage device 50 principally provides data security in the form of "blocking" access to a data port on another device, as well as physical security for the data storage device 50 (e.g., reduces the potential that the data storage device 50 will be stolen separately from the device on which it is installed).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A data storage system, comprising:
   a first data storage device comprising a first data storage medium, a locking slot, and a first USB port operatively interconnected with said first data storage medium, wherein said locking slot is adjacent to said first USB port; and
   a first USB plug engaged with said first USB port, the first USB plug comprising
   a first lock comprising a first latching member, wherein the first latching member comprises a first portion that is disposed within said locking slot, wherein said first lock retains said first latching member in engagement with said locking slot when said first lock is in a locked position, and wherein said first latching member, when in a latched position, retains said first USB plug in engagement with said first data port; and
   a first actuator at least operatively interconnectable with said first lock for moving said first lock between said locked position and an unlocked position when said first USB plug is engaged with said first data port.

2. The data storage system of claim 1, wherein said first data storage device is an external hard disk.

3. The data storage system of claim 1, wherein said first data storage device is a laptop computer.

4. The data storage system of claim 1, wherein said data storage device is a desktop computer.

5. The data storage system of claim 1, wherein said first latching member is mounted on a portion of said first USB plug that extends beyond said first USB port.

6. The data storage system of claim 1, wherein said first lock and said first latching member are structurally integrated with said first USB plug.

7. The data storage system of claim 1, further comprising a first data cable, wherein said first data cable comprises said first USB plug.

8. The data storage system of claim 7, wherein said first data cable comprises a second USB plug, wherein said second USB plug comprises a second lock, wherein said second lock comprises a second latching member, and wherein the data storage system further comprises a second actuator associated with said second lock.

9. The data storage system of claim 1, further comprising a second data storage medium operatively interconnected with said first USB plug.

10. The data storage system of claim 1, further comprising a memory storage device, that in turn comprises said first USB plug.

11. The data storage system of claim 1, further comprising a memory stick that in turn comprises said first USB plug.

12. The data storage system of claim 1, wherein said first data plug, said first latching member and said first lock comprise both means for controlling access to said first USB port and means for physically securing said first data storage device.

13. A data storage system, comprising:
    a first data storage device comprising a first data storage medium, a locking slot, and a first data port operatively interconnected with said first data storage medium;
    a first data cable comprising a first data plug and a first lock, wherein said first lock comprises a first latching member, wherein said first data plug is engaged with said first data port, and wherein said first lock retains said first latching member in engagement with said locking slot when said first lock is in a locked position, and wherein said first latching member, when in a latched position, retains said first data plug in engagement with said first data port; and
    a first actuator at least operatively interconnectable with said first lock for moving said first lock between said locked position and an unlocked position when said first data plug is engaged with said first data port, wherein the lock comprises one or more tumblers that each need to be disposed in a certain position in order to allow the actuator to be pressed, or wherein the actuator comprises a key.

14. The data storage system of claim 13, wherein said first data storage device is an external hard disk.

15. The data storage system of claim 13, wherein said first data storage device is a laptop computer.

16. The data storage system of claim 13, wherein said data storage device is a desktop computer.

17. The data storage system of claim 13, wherein said first data port is a USB port.

18. The data storage system of claim 13, wherein said first latching member comprises a first portion that is disposed within said locking slot.

19. The data storage system of claim 18, wherein said locking slot is adjacent to said first data port.

20. The data storage system of claim 13, wherein said first latching member is mounted on a portion of said first data plug that extends beyond said first data port.

21. The data storage system of claim 13, wherein said first lock and said first latching member are structurally integrated with said first data plug.

22. The data storage system of claim 13, wherein said first data cable comprises a second data plug, wherein said second data plug comprises a second lock, wherein said second lock comprises a second latching member, and wherein the data storage system further comprises a second actuator associated with said second lock.

23. The data storage system of claim 13, wherein said first data plug, said first latching member and said first lock comprise both means for controlling access to said first data port and means for physically securing said first data storage device.

\* \* \* \* \*